(12) United States Patent
Shaffer et al.

(10) Patent No.: US 6,298,119 B1
(45) Date of Patent: Oct. 2, 2001

(54) SYSTEM AND METHOD FOR DIGITAL TELEPHONE TROUBLE REPORTING

(75) Inventors: Shmuel Shaffer, Palo Alto; William J. Beyda, Cupertino, both of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/480,435

(22) Filed: Jan. 11, 2000

(51) Int. Cl.[7] ....................................................... H04M 1/24
(52) U.S. Cl. ..................... 379/29.07; 379/1.01; 379/9.03; 379/22.03; 379/22.08; 379/24; 379/31
(58) Field of Search .............................. 379/1, 9, 15, 27, 379/28, 29, 31, 32, 34, 24, 22.03, 22.08

(56) References Cited

U.S. PATENT DOCUMENTS

| | | | |
|---|---|---|---|
| 4,464,543 | * 8/1984 | Kline et al. ............................. | 379/16 |
| 5,687,212 | 11/1997 | Kinser, Jr. et al. ..................... | 379/10 |
| 5,764,918 | * 6/1998 | Poulter .............................. | 395/200.66 |
| 5,790,634 | 8/1998 | Kinser, Jr. et al. ..................... | 379/29 |
| 6,031,896 | * 2/2000 | Gardell et al. .................... | 379/88.17 |

\* cited by examiner

*Primary Examiner*—Binh Tieu (57) ABSTRACT

A system and method for telephone trouble reporting. One aspect of the present invention is a context-sensitive graphical user interface (GUI). The GUI allows a user to select a trouble reporting option at various stages of a telephone call in a telephony-over-LAN system. Thus, a series of menus listing potential call difficulties are provided in the interface of the digital or IP phone or telephony-enabled computer to the user during the telephone call. Selecting one of the options allows the user to report the problem to the server or other central switch.

9 Claims, 9 Drawing Sheets

SYSTEM AND METHOD FOR DIGITAL TELEPHONE TROUBLE REPORTING

BACKGROUND OF THE INVENTION

1. Field of the Invention

The present invention relates to communications systems and, in particular, to an improved system for reporting telephone trouble.

2. Description of the Related Art

Digital telephones, such as those complying with the International Telecommunication Union's H.323 Recommendation, are becoming increasingly sophisticated in the services offered to consumers. Correspondingly, however, customers expect a higher degree of performance and reliability.

Conventionally, when a consumer is experiencing service difficulties, such as static on a line, the consumer must manually dial a customer service number and wait to speak to one or more customer relations personnel. Often, this entails being placed on hold for an undesirably long period of time. Once live representatives are reached, the consumer must report the problem and, often, schedule a visit with a service technician.

There is therefore a need for an improved system and method for telephone trouble reporting. There is particularly a need for a more reliable, less time consuming system and method for telephone trouble reporting.

SUMMARY OF THE INVENTION

These and other drawbacks in the prior art are overcome in large part by a system and method for telephone trouble reporting according to the present invention. One aspect of the present invention is a context-sensitive graphical user interface (GUI). The GUI allows a user to select a trouble reporting option at various stages of a telephone call. Thus, a series of menus listing potential call difficulties are provided to the user during the telephone call. Selecting one of the options allows the user to report the problem to the server or other central switch.

A telephony device according to an implementation of the present invention is thus provided with a network interface and an ability to signal a central switch or server that the user is experiencing difficulties during or while making a call.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 1–9 illustrate an improved system and method for telephone trouble reporting. A telephony device according to an implementation of the present invention is provided with a network interface and is adapted to signal a central switch or server that the user is experiencing difficulties during or while making a call. One aspect of the present invention is a context-sensitive graphical user interface (GUI). The GUI allows a user to select a trouble reporting option at various stages of a telephone call. Thus, a series of menus listing potential call difficulties are provided to the user during the telephone call. Selecting one of the options allows the user to report the problem to the server or other central switch.

Figure 1:
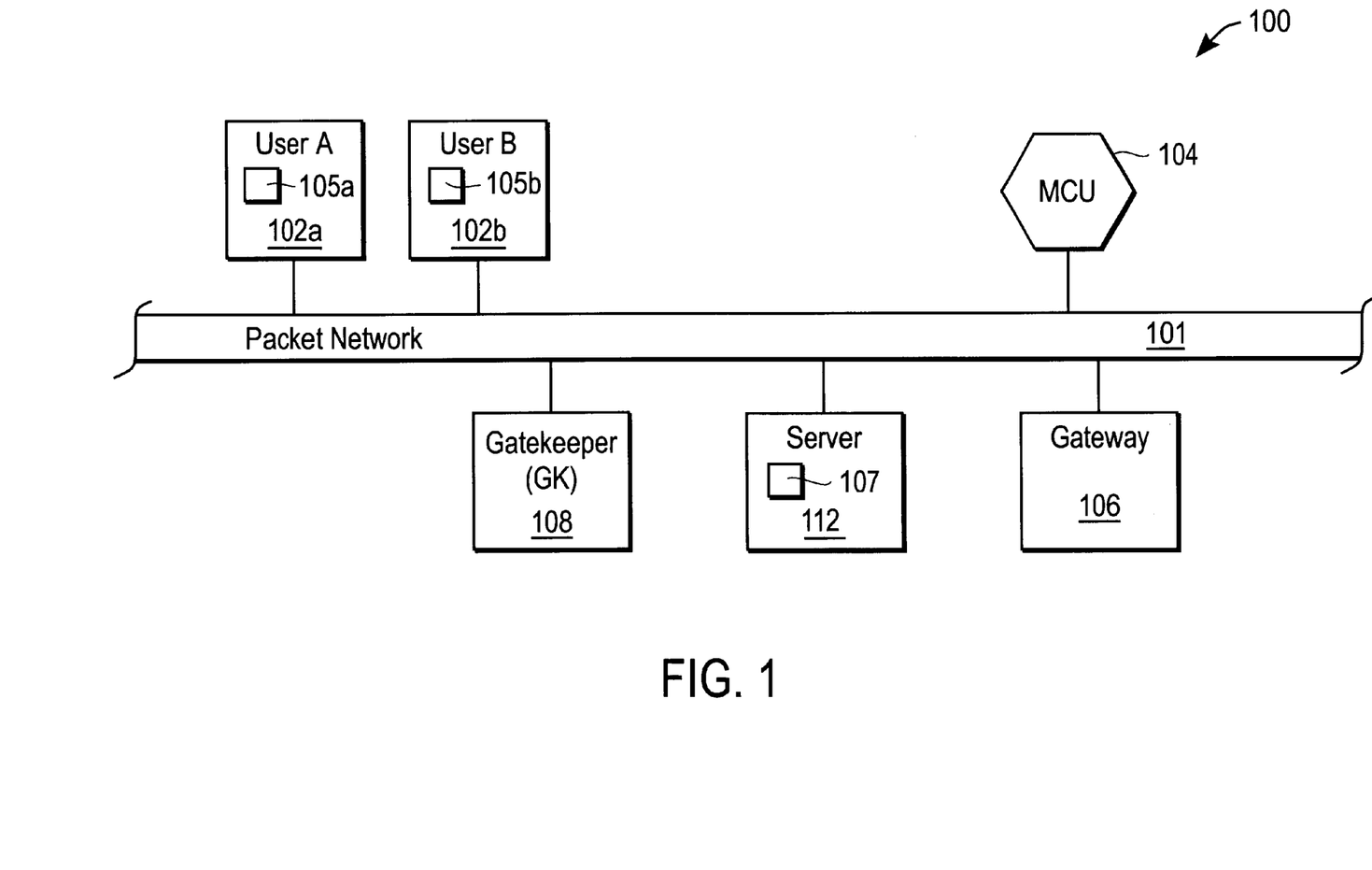
FIG. 1 is a diagram of an exemplary telephony network according to an implementation of the invention.

Turning now to FIG. 1, an exemplary telecommunications system 100 according to an embodiment of the invention is shown therein and identified by the reference numeral 100. The telecommunications system 100 includes a local area network (LAN) or packet network 101. Coupled to the LAN 101 may be a variety of H.323 terminals 102a, 102b, a multi-point control unit (MCU) 104, an H.323 gateway 106, an H.323 gatekeeper 108, a LAN server 112 and a plurality of other devices such as personal computers (not shown). The H.323 terminals 102a, 102b are in compliance with the H.323 Recommendation. Thus, the H.323 terminals 102a, 102b support H.245 control signaling for negotiation of media channel usage, Q.931 (H.225.0) for call signaling and call setup, H.225.0 Registration, Admission, and Status (RAS), and RTP/RTCP for sequencing audio and video packets. The H.323 terminals 102a, 102b may further implement audio and video codecs, T.120 data conferencing protocols and MCU capabilities. Further details concerning the H.323 Recommendation may be obtained from the International Telecommunications Union; the H.323 Recommendation is hereby incorporated by reference in its entirety as if fully set forth herein.

Further, the H.323 terminals 102a, 102b implement telephony status reporting units 105a, 105b according to an implementation of the present invention. As will be described in greater detail below, the status reporting units 105a, 105b may be implemented as graphical user interfaces (GUI) used to send status or trouble reporting messages across the network to a server or central switch, for example.

The LAN server 112 may also function as a telephony server. The telephony server includes a memory 107 for receiving notification of communication problems, as will be explained in greater detail below. It is noted that a telephony server to which the problem is reported may be located off-network 101. Thus, the figures are exemplary only.

Figure 2:
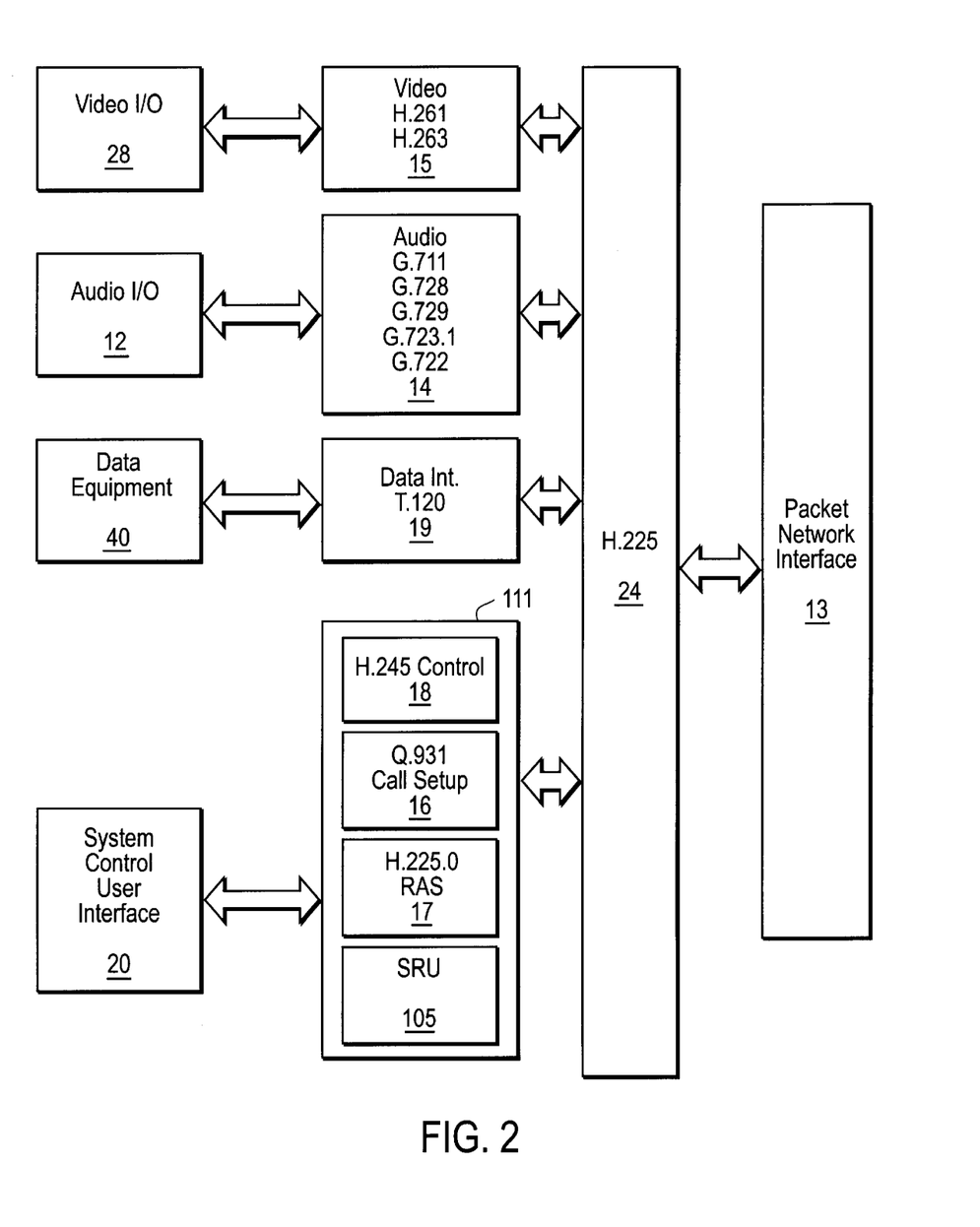
FIG. 2 is a diagram illustrating an H.323 interface according to an implementation of the invention.

In accordance with a specific embodiment, FIG. 2 illustrates a logical diagram of an H.323 interface to the LAN 101. The H.323 interface of network terminal/device 102 includes a status reporting unit 105 according to the present invention and a packet network interface 13 that is coupled to the network terminal 102. As will be discussed in greater detail below, the network terminal 102 utilizes the ITU-T H.323 Recommendation protocol. The network interface 13 couples the network terminal 102 to the LAN 101. The network can include packet-switched Transmission Control Protocol/Internet Protocol (TCP/IP) and Internet Packet Exchange (IPX) over Ethernet, Fast Ethernet and Token Ring networks.

The H.323 terminal 102 is coupled to a video input/output (I/O) interface 28, an audio I/O interface 12, a data equipment interface 40, and a system control user interface (SCUI) 20. The network terminal 102 further includes an H.225.0 layer 24, an audio coder/decoder (codec) 14 and may include, a video codec 15, and a T.120 data interface layer 19. The audio I/O interface or card 12, which may be part of the standard H.323 device, connects to the audio codec 14, such as a G.711 codec, for encoding and decoding audio signals. The audio codec 14 coupled to the H.225.0 layer 24 encodes audio signals for transmission and decodes the received signals. Although the G.711 codec is the mandatory audio codec for an H.323 terminal, other audio codecs, such as G.728, G.729, G.723.1, G.722, and MPEG1 audio may also be used for encoding and decoding speech. G.723.1 is a preferred codec because of its reasonably low bit rate, which enables preservation of link bandwidth, particularly in slower speed network connections.

The video I/O interface or card 28, which may be part of the standard H.323 device, connects to a video codec 15, such as an H.261 codec for encoding and decoding video signals. The video codec 15 encodes video signals for transmission and decodes the received signals. H.261 is the mandatory codec for H.323 terminals that support video, though other codecs such as H.263 may be supported.

The system control user interface (SCUI) 20 provides signaling and flow control for proper operation of the H.323 terminal 102. In particular, call signaling and control are handled via the SCUI 20 and, particularly, the control layer 111, which includes status reporting unit 105. The control layer 111 also includes a Q.931 layer 16, an H.225.0 RAS layer 17 and an H.245 layer 18. Thus, the SCUI 20 interfaces to the H.245 layer 18 which is the media control protocol that allows capability exchange, opening and closing of logical channels, mode preference requests, flow control messages, and other miscellaneous commands and indications. The SCUI 20 also interfaces to the Q.931 protocol 16, which defines the setup, teardown, and control of H.323 communication sessions. The SCUI 20 further interfaces to the H.225.0 Registration, Admission and Status (RAS) protocol that defines how H.323 entities can access H.323 gatekeepers to perform, among other things, address translation, thereby allowing H.323 endpoints to locate other H.323 endpoints via an H.323 gatekeeper. The H.225.0 layer 24, which is derived from the Q.931 layer 16 is the protocol for establishing a connection among two or more terminals and also formats the transmitted video, audio, data, signaling, and control streams into messages for communication via the network interface 13 (e.g., packet network 101). The H.225.0 layer 24 also retrieves the received video, audio, data, signaling and control streams from messages that have been input from the network interface, routes the signaling and control information to the control layer 111 and routes media streams to the appropriate audio, video and data interfaces. Further, as will be discussed in greater detail below, the SCUI 20 implements trouble reporting according to the present invention.

Thus, an H.323 network may be configured to include several different devices. For example, the network may include a terminal for enabling a user connected to a LAN to communicate with another user on the LAN, a terminal for enabling a caller resident on the LAN to call a second party in the public switched network and/or a terminal for enabling an adapter to communicate through a wireless trunk, using a wireless telephone. The device may also implement supplementary services according to the H.450.X Recommendations.

Figure 3:
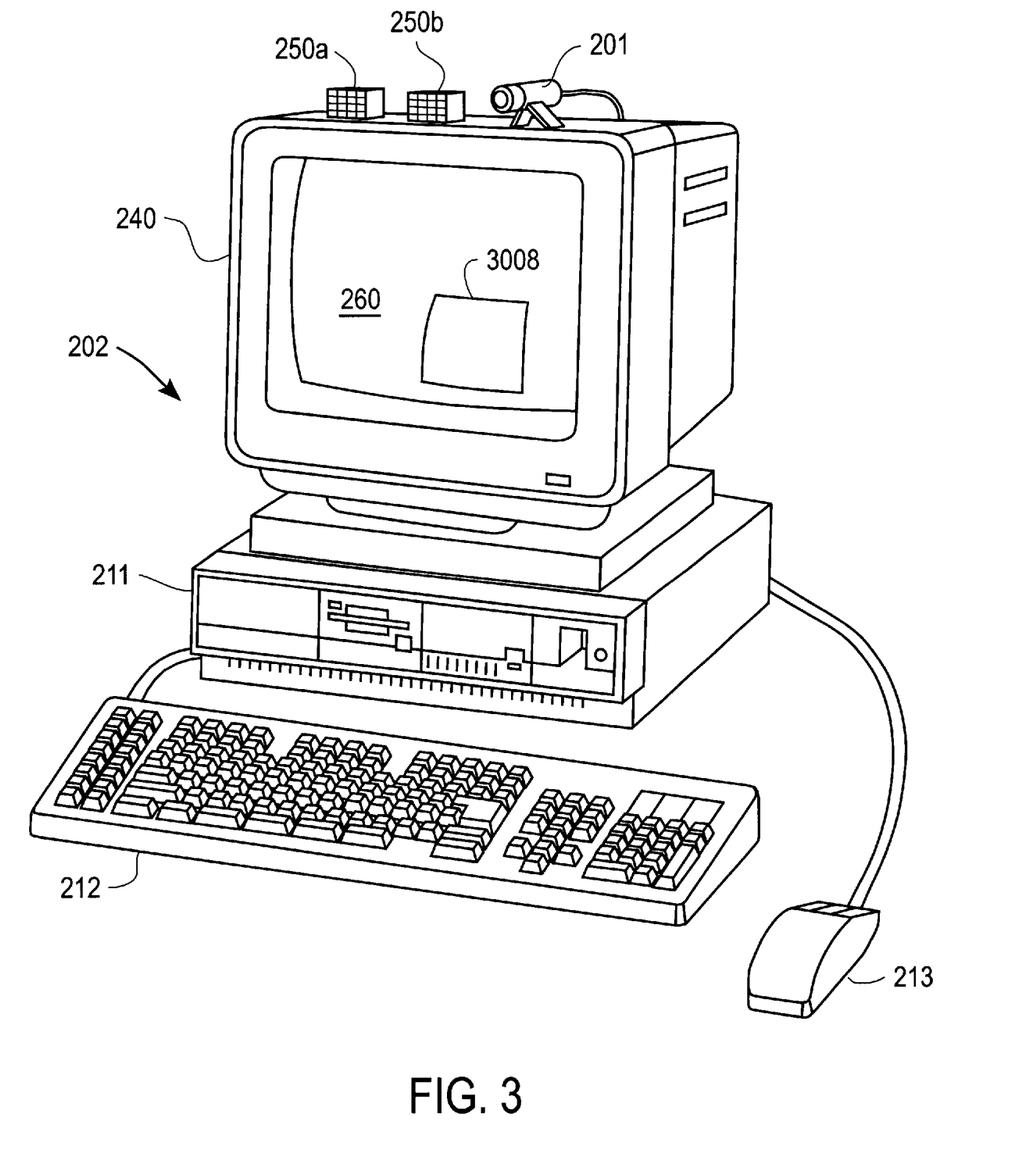
FIG. 3 is a diagram of a computer system according to an implementation of the present invention.

An exemplary client terminal is shown in FIG. 3. The client terminal may be embodied as a personal computer, including a system unit 211, a keyboard 12, a mouse 213, and a display 240. Also shown are one or more speakers 250a, 250b, and a microphone 201. The screen 260 of the display device 214 is used to present a graphical user interface (GUI), particularly, a telephony trouble reporting user interface 3008. The graphical user interface supported by the operating system allows the user to employ a point and click method of input, i.e., by moving the mouse pointer or cursor (not shown) to an icon representing a data object at a particular location on the screen 260 and pressing one or more of the mouse buttons to perform a user command or selection.

Figure 4:
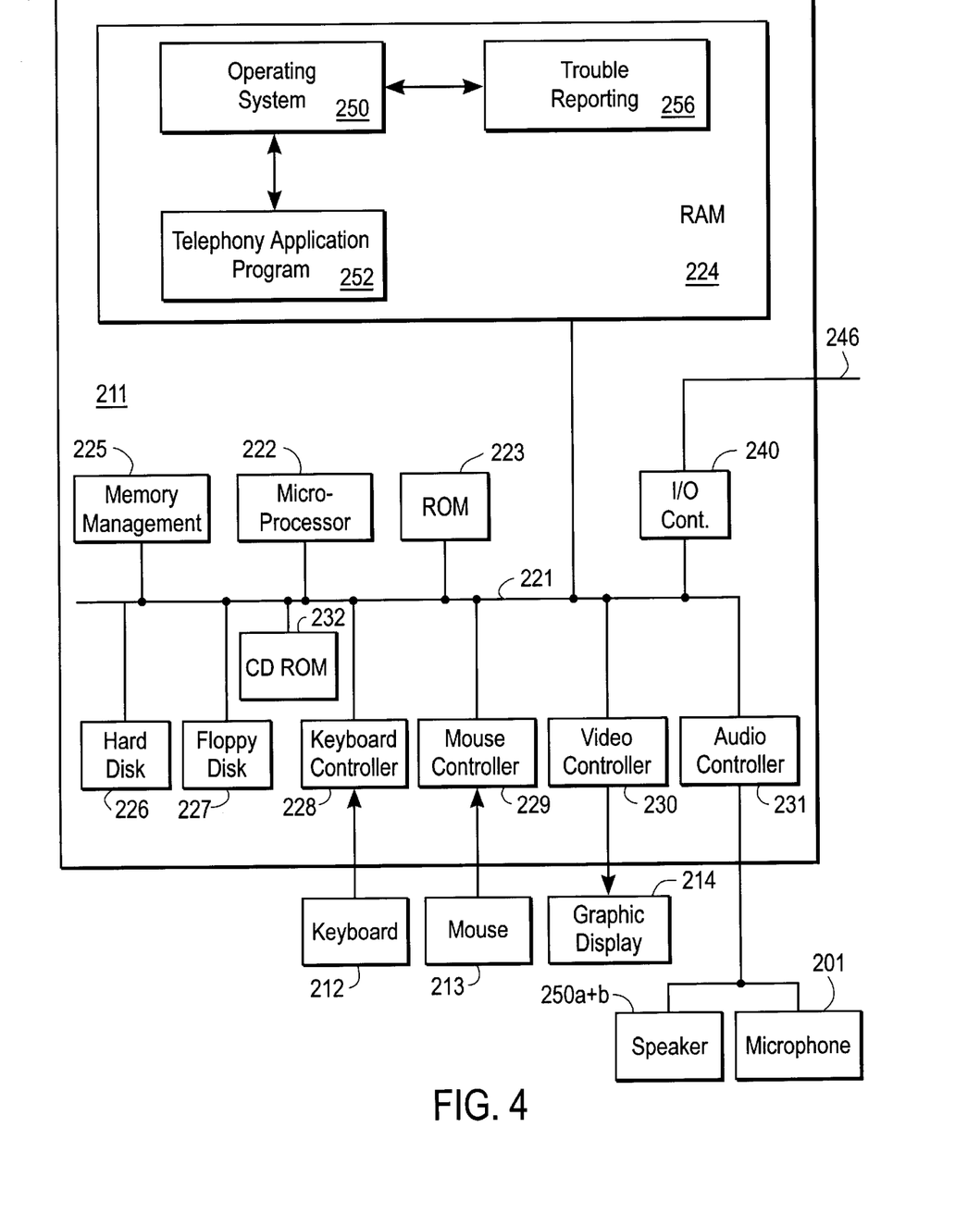
FIG. 4 is a block diagram of the computer system of FIG. 3.

FIG. 4 shows a block diagram of the components of the personal computer shown in FIG. 3. The system unit 211 includes a system bus or a plurality of system buses 221 to which various components are coupled and by which communication between the various components is accomplished. The microprocessor 222 is coupled to the system bus 221 and is supported by the read only memory (ROM) 223 and the random access memory (RAM) 224 also connected to the system bus 221. The microprocessor 222 may be embodied as any of a variety of microprocessors, including Intel x86, Pentium or Pentium II or compatible processors.

The ROM 223 contains among other code the basic input output system (BIOS) which controls basic hardware operations such as the interaction of the disk drives and the keyboard. The RAM 224 is the main memory into which the operating system and applications programs are loaded. The memory management chip 225 is connected to the system bus 221 and controls direct memory access operations including passing data between the RAM 224 and hard disk drive 226 and floppy disk drive 227. A CD ROM drive (or DVD or other optical drive) 232 may also be coupled to the system bus 221 and is used to store a large amount of data, such as a multimedia program or a large database.

Also connected to the system bus 221 are various I/O controllers: the keyboard controller 228, the mouse controller 229, the video controller 230, and the audio controller 231. The keyboard controller 228 provides the hardware interface for the keyboard; the mouse controller 229 provides the hardware interface for the mouse 213; the video controller 230 is the hardware interface for the video display 214; and the audio controller 231 is the hardware interface for the speakers 215 and microphone 201. The speakers 250a, 250b and the microphone 201 allow for audio communication during telephony operation. In operation, keyboard strokes are detected by the keyboard controller 228 and corresponding signals are transmitted to the microprocessor 222; similarly, mouse movements and button clicks are detected by the mouse controller and provided to the microprocessor 222. Typically, the keyboard controller 228 and the mouse controller 229 assert interrupts at the microprocessor 222. In response, the microprocessor 222 executes a corresponding interrupt routine, as is known. Additionally, an interrupt controller (not shown) may be provided to arbitrate among interrupt requests.

An I/O controller or network interface 240 enables communication over a network 246, such as a packet network. More particularly, the I/O controller 240, in conjunction with the processor 222 may implement the H.323 Recommendation interface of FIG. 2, to allow for telephony or multimedia communications via the packet switched network 101, as will be explained in greater detail below.

One embodiment of the present invention is as a set of instructions in a code module which may be resident in the RAM 224. Until required by the computer system, the set of instructions may be stored in another computer memory, such as the hard disk 226, on an optical disk for use in the CD ROM drive 232, or a floppy disk for use in the floppy disk drive 227.

As shown in FIG. 4, the operating system 250, the telephony application 252, and the trouble reporting application 256 are resident in the RAM 224. As is known, the operating system 250 functions to generate a graphical user interface on the display 214. The telephony application program 252 performs telephony functionality, and, with the trouble reporting application 256, generation of a trouble reporting client window 3008 (FIG. 3) in the GUI. In particular, as will be explained in greater detail below, the trouble reporting application 256 interacts with the status reporting unit 105 to monitor the status of the communication and generates an appropriate user interface window in response 3008 (FIG. 3). The user interface window is configured to present the user with one or more lists of potential troubles which are reported to the server or gatekeeper or other trouble receiving entity. In the embodiment shown, the problems may be reported using H.323 Recommendation compatible signaling.

It is noted that, while illustrated as a personal computer, the invention may be embodied in any digital or IP telephone. Further, while shown as an H.323 system, any digital telephone system may be employed. Thus, the figures are exemplary only.

Figure 5A:
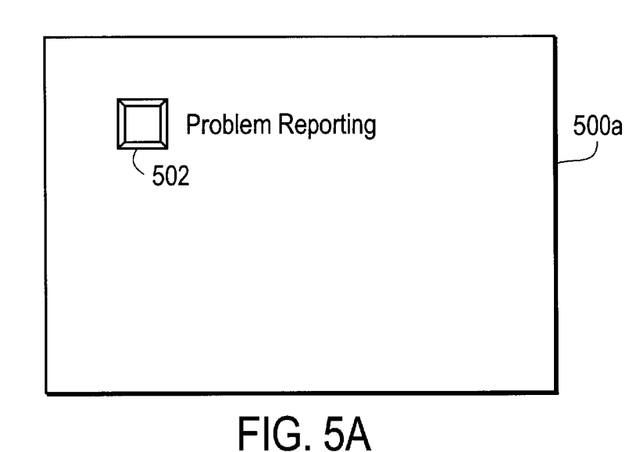
FIGS. 5A–5D illustrate an exemplary user interface according to an implementation of the present invention.
Figure 5B:
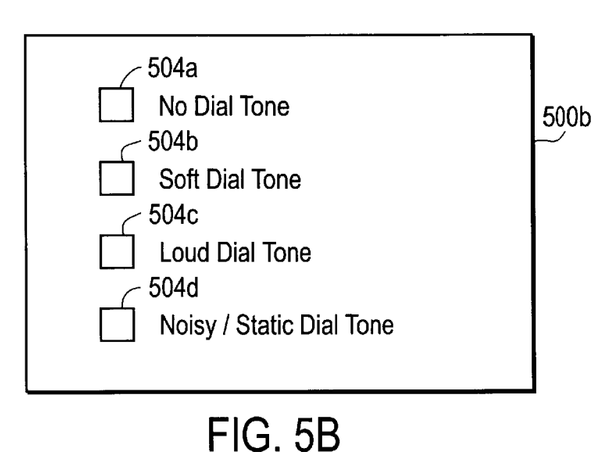
Figure 5C:
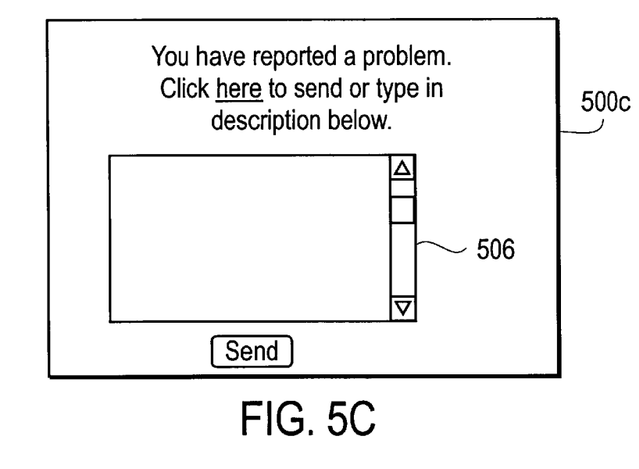
Figure 5D:
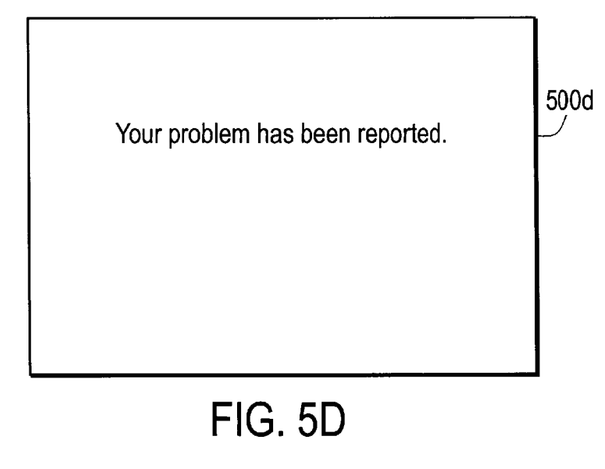

Turning now to FIGS. 5A–5D, operation of an embodiment of the invention is illustrated schematically. In particular, shown are exemplary graphical user interface screens at various stages of operation, for example, after off hook but prior to call setup. In particular, shown in FIG. 5A is an initial screen 500a, which may be displayed immediately after off hook. The initial screen 500a displays a button or hyperlink 502 which allows the user to select Problem Reporting. If the user clicks on the button 502, the screen 500b of FIG. 5B is displayed. The screen 500b includes a plurality of buttons or hyperlinks 504a–504d, which allow selection of No Dial Tone, Soft Dial Tone, Loud Dial Tone or Noisy/Static Dial Tone, respectively. If one of the problem reporting options is selected, then the screen 500c of FIG. 5C may be displayed. As shown, the screen 500c includes a reporting window 506 for providing information describing the problem. Alternatively, the user may simply click SEND to send the previously selected Problem Message. Once the problem has been reported, the screen 500d of FIG. 5D may be displayed, informing the user that the problem has been reported. A time and date receipt may also be provided. Various techniques may be used to send the problem message. For example, the problem may be reported with cgi-bin script or other techniques. It is noted that the screens 500a–500b may appear differently in operation, or may implement different problem reporting functions. Thus, the FIGS. 5A–5D are exemplary only.

Figure 6A:
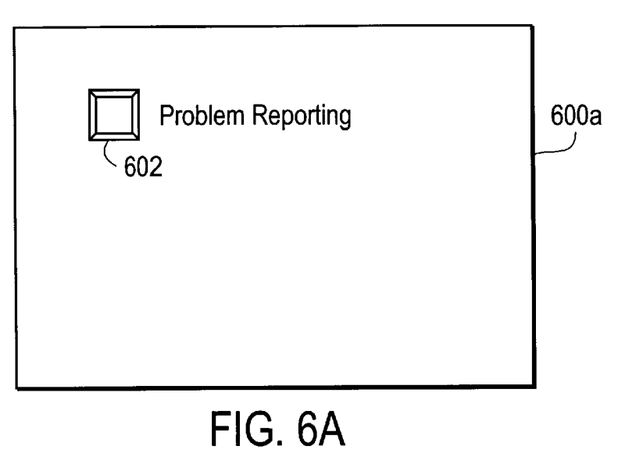
FIGS. 6A–6D illustrate an exemplary user interface according to another implementation of the present invention.
Figure 6B:
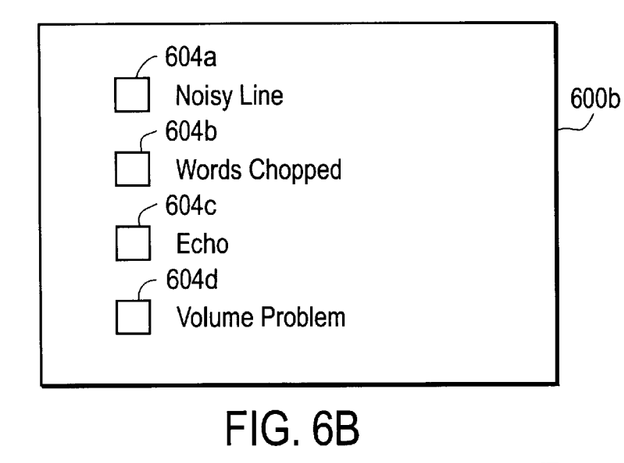
Figure 6C:
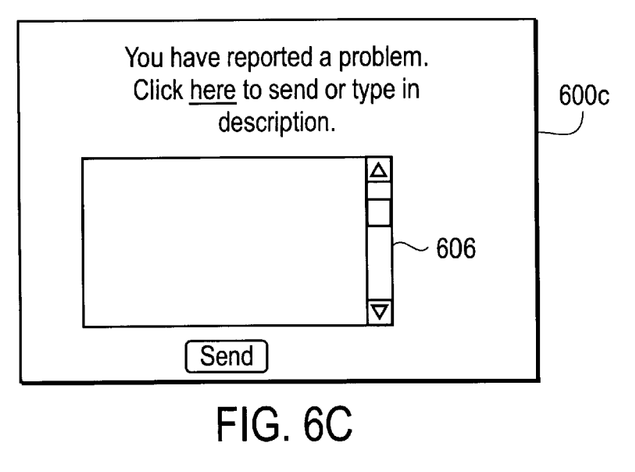
Figure 6D:
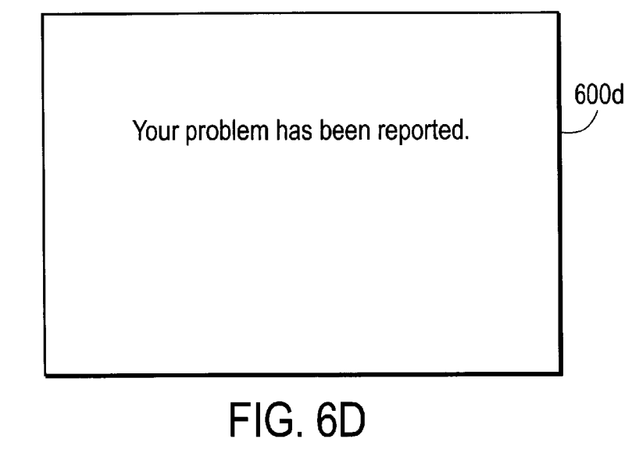

As noted above, one aspect of the invention is context-sensitive problem reporting. Thus, after call setup has occurred, or at various other stages of operation, other problem reporting options are available. For example, FIGS. 6A–6D illustrate various screens 600a–600d which may be displayed during problem reporting during a call. For example, FIG. 6A illustrates a screen 600a which includes a button or hyperlink 602 that allows a user to select a problem reporting option. If selected, then the screen 600b of FIG. 6B may be displayed. As shown, the screen 600b includes a list of potential problems, and selection buttons 604a–604d to allow reporting of, for example, Noisy Line, Words Chopped, Echo, or Volume Problems, respectively. If any of the problem reporting options is selected, then the screen 600c of FIG. 6C may be displayed. As shown, the screen 600c includes a window 606 to allow a user to enter a further description of the problem. Alternatively, the user may just send in one of the options already selected, without further comment. Finally, once the problem is reported, the screen 600d of FIG. 6D may be displayed, showing the user his report has been received. A time and date receipt may also be provided. Various techniques may be used to send the problem message. For example, the problem may be reported with cgi-bin script or other techniques. It is noted that the screens 600a–600d may appear differently in operation, or may implement different problem reporting functions. Thus, the FIGS. 6A–6D are exemplary only.

Further, it is noted that, while described above with reference to a plurality of context-sensitive sequences related to stage of call of screen options, a single window containing a list of potential problem, indexed by stage of call, may be provided.

Figure 7:
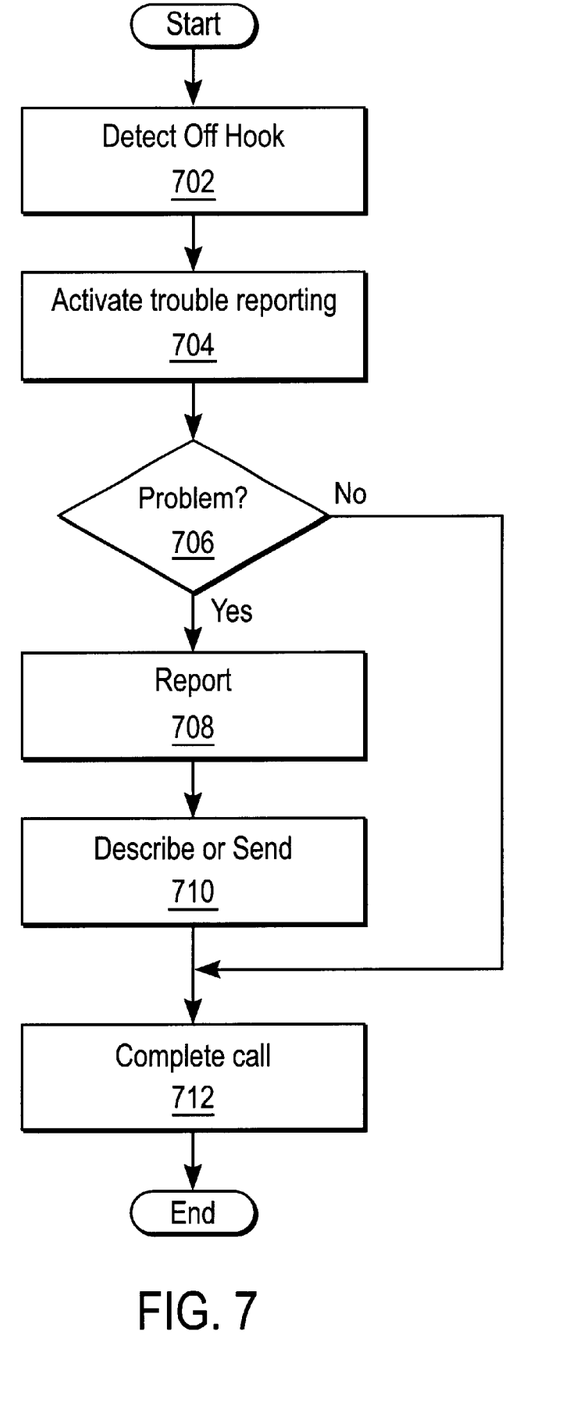
FIG. 7 is a flowchart illustrating operation of an implementation of the invention.

Turning now to FIG. 7, a flowchart illustrating operation of an embodiment of the invention is shown. In a step 702, an off hook condition is detected. In response, in a step 704, the telephony application program 252 activates the trouble reporting program 256. The trouble reporting program 256 then causes the trouble reporting screen to be displayed on the monitor. If there is a problem, identified by the user in step 706, then the user can select the reporting option in a step 708. As discussed above, this can include the user selecting the trouble reporting button or hyperlink. In a step 710, the user may report the problem via the status reporting unit 105, for example, by selecting one or more problem-associated buttons or hyperlinks, as described above. Alternatively, the user may type in a description of the problem. The user may then make the call, in a step 712. A different trouble reporting option may then be provided to the user, associated with the stage of the call the user is currently in.

As discussed above, one application of the present invention is in H.323 telephony-over-LAN systems. In particular, with reference to FIG. 8, in a step 802, a user takes the phone off hook to make a call. This activates the trouble reporting option in a step 804a. In a step 806a, if there is a problem, the user may report it, in a step 808a, as generally described above. If not, the trouble reporting program cycles back to await the next stage in operation.

Figure 8:
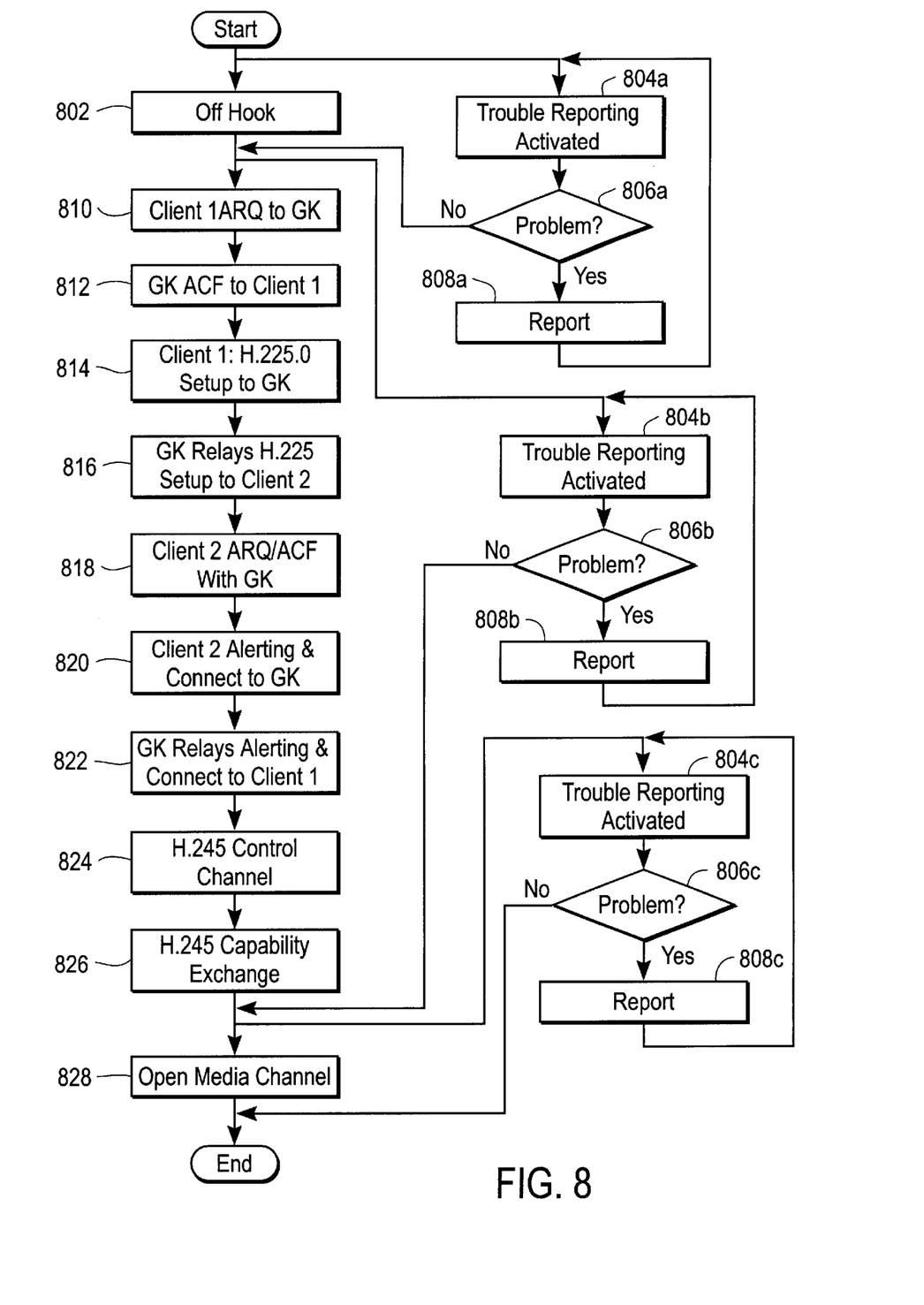
FIG. 8 is a flowchart illustrating operation of an implementation of the invention.

In the example shown, the endpoint Client 1 sends an ARQ message (AdmissionRequest) to the gatekeeper GK in a step 810. The gatekeeper GK responds with an ACF (AdmissionConfirm) message to Client 1, in a step 812. The ACF message includes a Call Signaling Transport Channel Address of the gatekeeper GK. In a step 814, in response to the ACF message, the endpoint Client 1 sends an H.225.0 setup message to the gatekeeper GK.

In a step 816, the gatekeeper GK relays the H.225.0 setup message to the endpoint Client 2. In response, in a step 818, the endpoint Client 2 conducts an ARQ/ACF exchange with the gatekeeper GK. In a step 820, the endpoint Client 2 sends H.225.0 Alerting and Connect messages to the gatekeeper GK as the call progresses to the connect state. The gatekeeper GK, in turn provides the Alerting and Connect messages to the endpoint Client 1 In a step 822. The Alerting or Connect message includes the Gatekeeper H.245 Control Channel Transport Address, which is used, in a step 824, to establish the H.245 control channel. Next, an H.245 capability exchange is undertaken, in a step 826.

As noted above, one aspect of the present invention is context-sensitive trouble reporting. A different set of options may be provided depending on the state of the call. Thus, in parallel with steps 810–828, the trouble reporting option is activated, in a step 804b. Again, if a problem in this phase of call setup is detected by the user in a step 806b, the user can report the problem, in a manner similar to that described above, in a step 808b. Otherwise, the system cycles to step 828, the opening of the media channel.

The opening of the media channel in step 828 (and subsequent communication along the media channel) is another stage in potential trouble reporting. Thus, in a step 804c, the trouble reporting program is activated. If a problem is detected in step 806c, then in a step 808c, the trouble may be reported in a manner similar to that described above.

Figure 9:
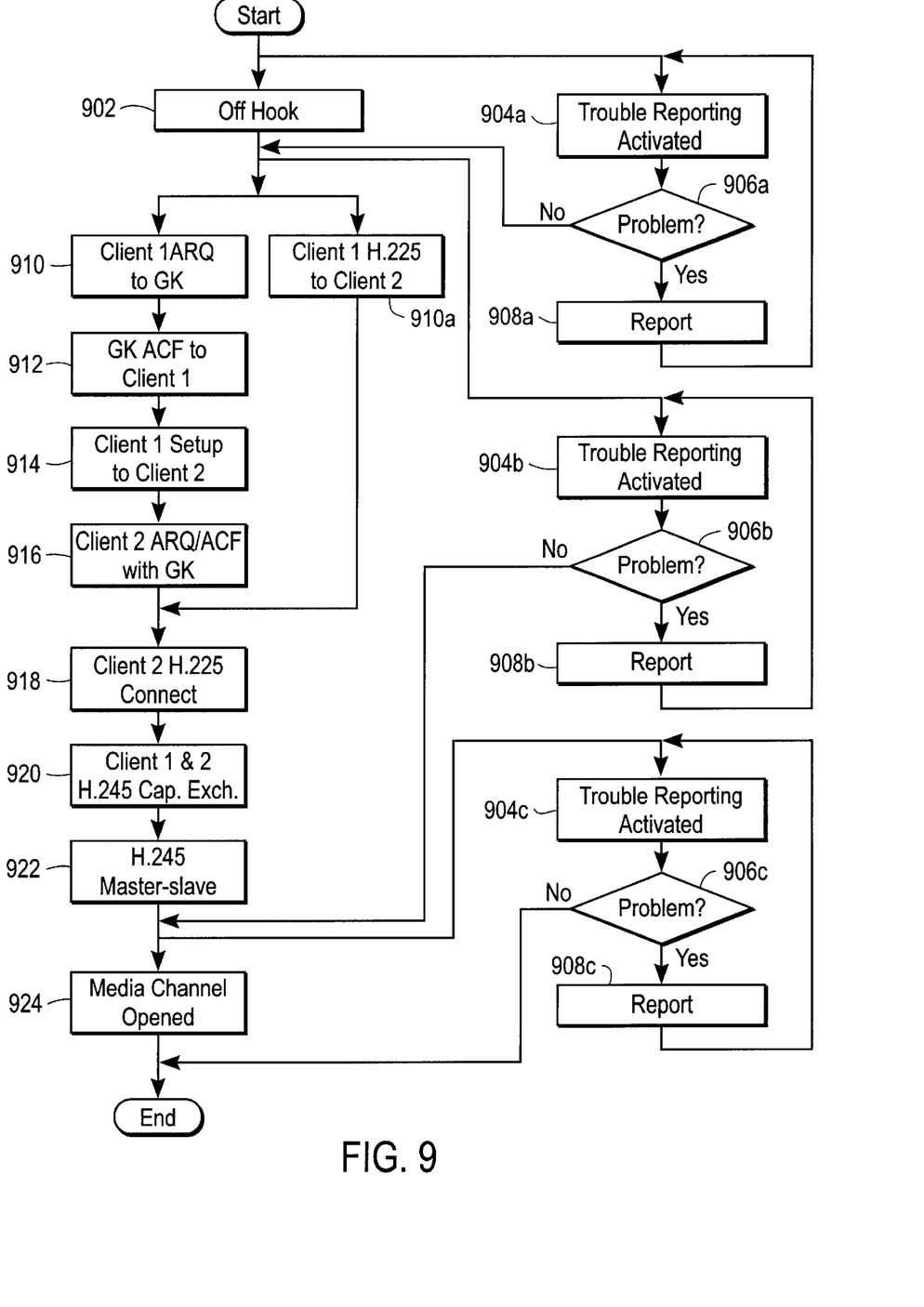
FIG. 9 is a flowchart illustrating operation of an implementation of the invention.

A similar command sequence is used in an implementation employing the H.323 direct signaling model, as shown in FIG. 9. In a step 902, a user takes the phone off hook to make a call. This activates the trouble reporting option in a step 904a. In a step 906a, if there is a problem, the user may report it, in a step 908a, as generally described above. If not, the trouble reporting program cycles back to await the next stage in operation.

In a step 910, the endpoint Client 1 sends an ARQ message to the gatekeeper GK requesting that a call to endpoint Client 2 be allowed using a direct call model. In a step 912, the gatekeeper GK responds with an ACF message to the endpoint Client 1. The ACF message includes a Call Signaling Transport Channel Address of the endpoint Client 2. In a step 914, in response to the ACF message, endpoint Client 1 sends an H.225.0 Setup message directly to endpoint Client 2. In response to the setup message, in a step 916, the endpoint Client 2 conducts an ARQ/ACF exchange with the gatekeeper GK. Alternatively, the exchange of ARQ/ACF messages may be omitted. That is, a direct call may be established between the endpoints client 1 and 2 with no involvement of gatekeeper GK. In this scenario, steps 910–916 are omitted. That is, in a step 910a, the endpoint Client 1 sends an H.225.0 message directly to endpoint Client 2. This causes endpoint Client 2 to process the received H.225.0 Setup message. Next, in a step 918, the endpoint Client 2 sends an H.225.0 Connect message to the endpoint Client 1 to progress the call to a connect state. In a step 920, the endpoint Clients 1 and 2 exchange H.245 terminal capability messages. In a step 922, the endpoints Client 1 and Client 2 exchange H.245 master-slave determination messages and any other needed H.245 messages.

As noted above, one aspect of the present invention is context-sensitive trouble reporting. Thus, in parallel with steps 910–922, the trouble reporting option is activated, in a step 904b. Again, if a problem in this phase of call setup is detected by the user in a step 906b, the user can report the problem, in a manner similar to that described above, in a step 908b. Otherwise, the system cycles to step 924, the opening of the media channel.

Finally, in a step 924, a media channel is opened between the endpoints. The opening of the media channel in step 924 (and subsequent communication along the media channel) may be another stage in potential trouble reporting. Thus, in a step 904c, the trouble reporting program is activated. If a problem is detected in step 906c, then in a step 908c, the trouble may be reported in a manner similar to that described above.

The invention described in the above detailed description is not intended to be limited to the specific form set forth herein, but is intended to cover such alternatives, modifications and equivalents as can reasonably be included within the spirit and scope of the appended claims.

What is claimed:

1. A telecommunications method, comprising:

providing a context-sensitive graphical user interface, said context-sensitive graphical user interface comprising an interface for reporting a telecommunications problem, said graphical user interface providing a display of different sets of potential telecommunications problems based on a stage of a call;

receiving an input indicative of said telecommunications problem;

converting said input to a signal;

providing said signal to a telecommunications server; and storing data representative of said signal at said telecommunications server, said providing a display comprising detecting an off hook condition and displaying potential dial tone problems prior to connection of said call.

2. A telecommunications method in accordance with claim 1, said graphical user interface providing a display of different sets of potential telecommunications problems based on a stage of a call.

3. A telecommunications device, comprising:

a bus;

a processor operably coupled to said bus;

a display operably coupled to said bus; and a telecommunications interface operably coupled to said bus;

wherein said processor is configured to provide on said display a context sensitive graphical user interface of potential problems associated with a call made via said telecommunications interface, said graphical user interface providing a display of different sets of potential telecommunications problems based on a stage of a call;

said processor configured to detect an off hook condition and display potential dial tone problems prior to connection of said call.

4. A telecommunications device in accordance with claim 3, processor configured to display potential connection problems after said call has been connected.

5. A telecommunications system, comprising:

means for providing a context-sensitive graphical user interface, said context-sensitive graphical user interface comprising an interface for reporting a telecommunications problem, said graphical user interface providing means providing a display of different sets of potential telecommunications problems based on a stage of a call;

means operably coupled to said providing means for receiving an input indicative of said telecommunications problem;

means for converting said input to a signal;

means for providing said signal to a telecommunications server; and means associated with said telecommunications server for storing data representative of said signal at said telecommunications server;

said graphical interface providing means including means for detecting an off hook condition and displaying potential dial tone problems prior to connection of said call.

6. A telecommunications system in accordance with claim 5, said providing a display means comprising means for displaying potential connection problems after said call has been connected.

7. A telecommunications method, comprising:

provided a context-sensitive graphical user interface, said context-sensitive graphical user interface comprising an interface for reporting a telecommunications problem, said graphical user interface providing a display of different sets of potential telecommunications problems based on a stage of a call;

establishing an off hook condition;

conducting an H.323 set up procedure;

establishing a media channel; and displaying potential sets of problems on said graphical user interface during said off hook condition, said set up procedure, and said media channel, responsive to said establishing said off hook condition, thereby allowing a user to report said problems to a server.

8. A telecommunications device, comprising:

a bus;

a processor operably coupled to said bus;

a display operably coupled to said bus; and a telecommunications interface operably coupled to said bus;

wherein said processor is configured to provide on said display a context sensitive graphical user interface of potential problems associated with a call made via said telecommunications interface, said graphical user interface providing a display of different sets of potential telecommunications problems based on a stage of a call, said processor configured to display potential dial tone problems prior to connection of said call responsive to an off hook condition.

9. A telecommunications device in accordance with claim 8, processor configured to display potential connection problems after said call has been connected.

* * * * *